(No Model.)
E. A. PETERSON.
SNOW SHOE ATTACHMENT FOR BICYCLES.
No. 573,034. Patented Dec. 15, 1896.
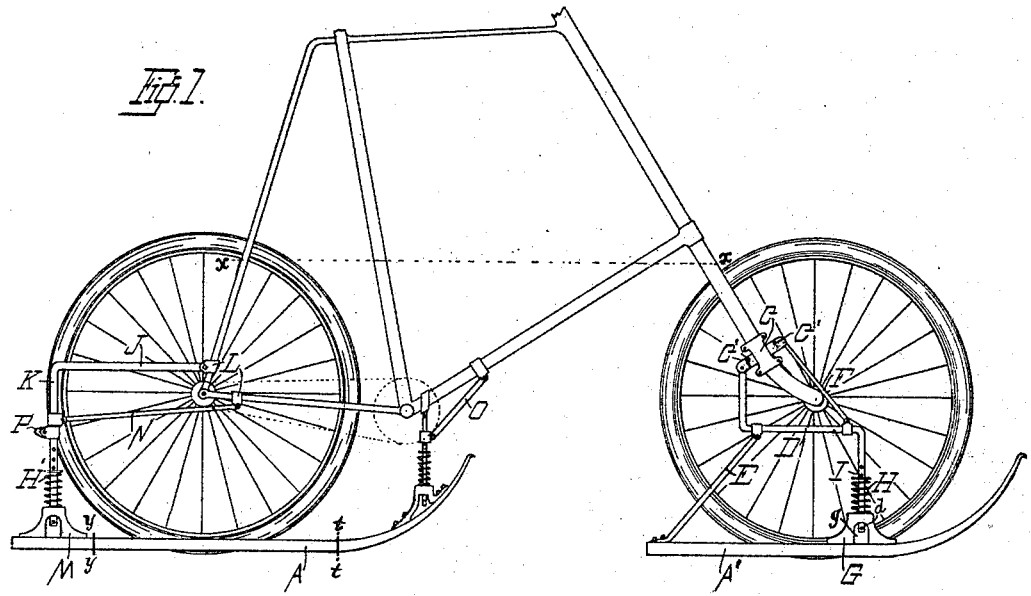
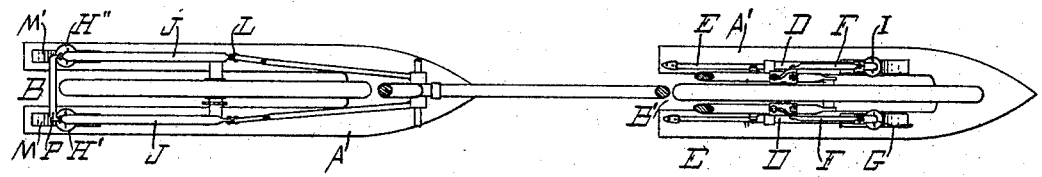
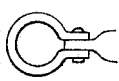
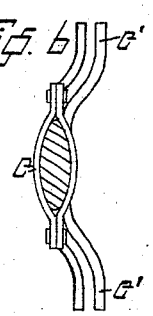
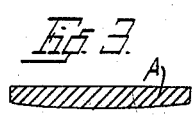
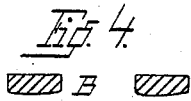
Witnesses:
Ferd A. Otto
James W. Dickinson
Inventor
Emil A. Peterson
By Erwin Wheeler & Wheeler
Attorneys.
THE NORRIS PETERS CO., PHOTO-LITHO., WASHINGTON, D. C.

UNITED STATES PATENT OFFICE.

EMIL A. PETERSON, OF APPLETON, WISCONSIN.

SNOW-SHOE ATTACHMENT FOR BICYCLES.

SPECIFICATION forming part of Letters Patent No. 573,034, dated December 15, 1896.

Application filed January 27, 1896. Serial No. 576,929. (No model.)

*To all whom it may concern:*

Be it known that I, EMIL A. PETERSON, a citizen of the United States, residing at Appleton, in the county of Outagamie and State of Wisconsin, have invented new and useful Improvements in Bicycle Snow-Shoe Attachments, of which the following is a specification.

My invention relates to improvements in that class of bicycle attachments adapted to facilitate travel over snow or ice.

The object of my invention is to provide the bicycle with an elastic supporting-shoe whereby the bicycle is supported against the tendency to slip laterally and the snow is packed in front of the wheels and the wheels buoyed up on it.

In the following description reference is had to the accompanying drawings, in which—

Figure 1 is a side elevation of a bicycle with my invention attached thereto. Fig. 2 is a top view, in section, drawn on the line $x$ $x$ of Fig. 1. Fig. 3 is a cross-section of the shoe, drawn on the line $t\,t$ of Fig. 1. Fig. 4 is a cross-section of the shoe, drawn on the line $y\,y$ of Fig. 1. Fig. 5 is an end view of one of the clamps for attaching my invention to the frame-rods of the bicycle. Fig. 6 is a similar view of the clamp for engaging the front fork.

Like parts are identified by the same reference-letters throughout the several views.

To attain my object, I have attached the bifurcated shoes A and A' to the front and rear wheels, respectively, with the wheels projecting through the open spaces B and B' and the front end of the shoe curved upwardly, as shown in Fig. 1, and preferably tapered, as best shown in Fig. 2.

The shoes are elastically attached to the bicycle-frame, so as to raise or lower automatically as the depth of the snow increases or diminishes, and the bottom of the shoe is preferably formed with an under surface convex in cross-section, as shown in Fig. 3, to keep the snow from being forced over the edges. The front shoe is secured to the fork of the front wheel on each side by the clamp C, outwardly-bent arms C', and the bent rod D, together with the brace-rods E and F. The lower end of the rod D is movably secured in the upwardly-projecting shoe-block G by the pin $d$, projecting into the opening or recess $g$ of the block, and is supported by the spiral spring H, intervening between the top of the block G and the cross-pin I. The rear shoe is secured to the frame-rods of the bicycle by the bent rods J and vertical rod K, clamped to the frame by clamps L, and with their lower ends secured in blocks M and M', and supported by springs H' and H'' in the same manner as the rod D is supported from the front shoe. The rods J and K may be formed integrally of a single piece bent into the required shape, as shown in the drawings, or they may be formed separately and screwed together or otherwise united in any well-known manner.

N and O are brace-rods adapted to support the shoe longitudinally, and P is a cross-brace adapted to support the rear ends of the shoe from spreading laterally. It will be observed that the clamps L and C can be easily adjusted to hold the shoes at different heights or to adapt them to bicycles of different sizes.

Having thus described my invention, what I claim as new, and desire to secure by Letters Patent, is—

A snow-shoe attachment for bicycles, consisting in the combination with the bifurcated shoes through which the wheels are adapted to project, clamps C adapted to be removably attached to the front fork of the bicycle and provided with offset-arms connected by suitably-braced rods with the front shoe, whereby the latter is connected with the bicycle on each side at a single point of attachment, and connecting-rods extending from both ends of the rear shoe, and removably attached to the bicycle-frame rods, substantially as described.

In testimony whereof I affix my signature in the presence of two witnesses.

EMIL A. PETERSON.

Witnesses:
C. E. CRIDER,
JACOB CRIDER.